United States Patent Office 3,527,560
Patented Sept. 8, 1970

3,527,560
COMPOSITION OF SODIUM CHLORIDE, POTASSIUM CHLORIDE, OR MIXTURES THEREOF, CONTAINING ANTI-CAKING ADDITIVE OF IRON CYANIDE COMPLEX AND ALCOHOL
Glen E. Binsley, Marysville, Mich., assignor to Diamond Crystal Salt Company, St. Clair, Mich., a corporation of Michigan
No Drawing. Continuation-in-part of application Ser. No. 506,599, Nov. 5, 1965. Application Ser. No. 740,398, Mar. 14, 1968, is a division of said continuation-in-part. This application June 3, 1968, Ser. No. 733,813
Int. Cl. C01d 3/04; C09k 3/18
U.S. Cl. 23—89
16 Claims

ABSTRACT OF THE DISCLOSURE

A particulated salt composition including an anticaking additive solution containing a water soluble iron cyanide complex and an alcohol, preferably for example sodium ferrocyanide (YPS) and glycerine.

CROSS REFERENCE TO RELATED APPLICATION

This application is a continuation-in-part application relative to copending U.S. patent application Ser. No. 506,599, filed Nov. 5, 1965, now abandoned. Reference is also here made to copending application Ser. No. 740,398, filed Mar. 14, 1968, Pat. No. 3,490,744, which is a divisional application relative to parent case Ser. No. 506,599.

BACKGROUND OF THE INVENTION

This invention relates to noncaking salt compositions and the anticaking additives used to inhibit caking in these compositions. In particular these salt compositions may be sodium chloride and/or potassium chloride (potash) compositions, designated NaCl and KCl, respectively.

In the past, caking of salt products has long been a problem to those who package, manufacture, store or sell salt. An extended discussion of the caking of salt can be found in Kaufmann on "Sodium Chloride" at pages 525 to 541 published by Reinhold Publishing Corp. of New York in 1960; American Chemical Society Monograph Series No. 145; Library of Congress Catalog Card No. 60–10504. The caking of salt is caused by moisture which gets in between the crystals of the salt and partially dissolves minute quantities of the sodium chloride which dissolved quantities then come in contact with other salt particles. As the salt redries, the salt solution bridging the salt particles at their points of contact evaporates and leaves crystallized sodium chloride causing a structural connection between the salt particles, or in other words, caking of the salt particles. For example, fine flake salt is subject to severe caking during storage periods and when the flake salt is placed under pressure in bags that are palletized or stacked one on top another, the caking is especially severe. If such hot flake salt from its production process is cooled before packaging, the tendency to cake is lessened, however, cooling of the salt before packaging requires expensive extra equipment and does not guarantee caking resistance. Therefore, an anticaking additive is required, and the use of various prior art anticaking additives has been attempted with fine flake salt, such as for example, tricalcium phosphate, sodium ferrocyanide and the like; however, none of these have proved completely satisfactory for one reason or another. A good anticaking additive which is attractive for reasons such as low cost is sodium ferrocyanide decahydrate, also known as yellow prussiate of soda (YPS). When YPS is added to salt as an anticaking additive, it is usually added in the form of a water-YPS solution, but when such an aqueous solution is added to hot fine flake salt from its production process, the moisture in the YPS solution causes caking of the salt making the YPS relatively ineffective. In order to avoid this, it is necessary to redry the fine flake salt after the YPS-water addition, but this leads to increased processing costs such as drying, rescreening, conveying, etc. Another alternative is to treat the fine flake salt prior to its delivery to the dryer or cooler if one is available with a YPS-water solution, and this is a common practice in the production of evaporated granulated salt. However, this technique is also not completely satisfactory in that some of the YPS is invariably lost in the dryer or cooler as fines elutriated off in the vented air, and the finer grains of salt achieve a higher weight percentage of YPS (because of a higher surface area to weight ratio) than the coarser grains leading to an uneven distribution of the anticaking additive. Therefore, there has been a heretofore unfilled need for an anticaking additive mixture which can be added to flake salt as well as other particulated salt products while still in a hot condition to thereby allow the bagging of the product immediately thereafter without drying or cooling, and without experiencing caking of the bagged salt over relatively long storage periods, under pressure from palletizing, variable moisture conditions, etc. Also, the constituents of the mixture should be able to absorb to a certain extent the included moisture in the salt crystals, which moisture comes to the surface of the crystals during drying and long storage.

One object of this invention is to provide an improved anticaking additive for salt which possesses synergistic anticaking characteristics and overcomes the problems and disadvantages associated with anticaking agents heretofore known.

Another object of the invention is to provide a salt composition having improved resistance to caking of the salt.

Still another object of the invention is to provide an improved process for treating salt to render it substantially noncaking.

Still further, it is an object of this invention to provide an efficient method of preparing said anticaking additives.

Still further, it is a specific of the invention to provide salt compositions which resist caking due to their being treated with an anticaking additive comprised of an iron cyanide complex, an alcohol and water.

Other objects, features and advantages of the present invention will become apparent from the subsequent description and the appended claims.

SUMMARY OF THE INVENTION

This invention involves a particulated salt composition having on at least a portion of the surfaces of the particles thereof an anticaking additive solution comprising a water soluble iron cyanide complex present in an amount of from about 0.00005% to about 0.01% by weight of said composition, and alcohol solvent present in an amount of from about 0.010% to about 1% by weight of said composition, said alcohol being selected from the group consisting of polyhydric alcohol, or polyhydric alcohol in mixture with monohydric alcohol, said salt being selected from the group consisting of sodium chloride, potassium chloride, or mixtures thereof; and, the method of treating particulated salt using the anticaking additive solution.

Broadly stated, this invention comprises first, a particulated salt composition which exhibits improved resistance to caking by reason of its containing intermixed therewith a water soluble iron cyanide complex and an alcohol. A second embodiment of the invention is comprised of an anticaking additive for salt wherein said additive contains a water soluble iron cyanide complex, an alcohol and water. A third embodiment of the invention is a method of treating particulated salt such that it is rendered substantially noncaking due to the salt having applied thereto an anticaking additive containing a water soluble iron cyanide complex, an alcohol and water.

In accordance with the concept of the present invention, it has been discovered that salt compositions can be rendered substantially noncaking by the addition of an anticaking additive comprised of a water soluble iron cyanide complex, an alcohol and water.

The primary benefits of the invention are first, that the need for additional drying or cooling equipment is obviated. This means that the expensive procedure of cooling the salt, such as the fine flake type, before packaging when no anticaking additive is used, need not be resorted to. In addition, the anticaking additive of this invention can be intermixed with the hot salt from production by maintaining the water content in the additive relatively low, and the anticaking additives of the invention will not vaporize since they possess low vapor pressures. Hence no further drying is necessary prior to bagging or storing the salt. Second, the anticaking additive mixture of this invention has been found to exhibit synergistic effects in reducing caking not found in the individual constituents of the additive and not expected from their combination. Third, the constituents of the mixture have the ability to absorb the included moisture in the salt crystals, which moisture comes to the surface of the crystals during drying in long storage.

As used herein, the term water soluble iron cyanide complex means the alkali metal and the alkali earth metal ferrocyanide and ferricyanide salts or mixtures thereof, which are water soluble. Such materials include, for example, the potassium, calcium and sodium ferricyanides. However, preferred results have been obtained with sodium ferrocyanide and potassium ferricyanide, and therefore these are the preferred materials for use as the iron cyanides in the anticaking additives of the invention.

As to the alcohol which may be used in the anticaking additive of the invention, examples thereof are as follows: glycerine, propylene glycol, ethylene glycol, diethylene glycol, sorbitol, mannitol and mixtures thereof. Certain monohydric alcohols are also usable in the invention such as methyl alcohol, ethyl alcohol, and propyl alcohol, however, the monohydric alcohols have not been found to give practicable results unless mixed with polyhydric alcohols; therefore, the most suitable results are obtained with polyhydric alcohols such as glycerine, propylene glycol, sorbitol, or mixtures thereof, and therefore these polyhydric alcohols are preferred for use in anticaking additives of this invention. It is to be understood by the use of the term polyhydric alcohols herein that by this term it is also meant to include mixtures of the polyhydric alcohols with allowable amounts of monohydric alcohols. The monohydric alcohols usable in the invention in this manner should be liquid water soluble monohydric alcohols at room temperature. Of the preferred alcohols, the alcohol which has given the best results is glycerine, and therefore for a purpose of the anticaking additives of this invention, glycerine is the best alcohol for use therewith. As used herein, the term alcohol includes either monohydric or polyhydric alcohols. Still further, it is to be noted that the above alcohols are generally liquid at room temperature, and also these alcohols are water soluble, hence the alcohols may at the very least be readily liquified in combination with water.

The inclusion of controlled quantities of alkaline materials such as sodium carbonate ($Na_2CO_3$) has been found advantageous in preventing discolorations of the salt and equipment when employing processing equipment conducive to the formation of Prussian blue by reaction of iron with the cyanide complex. The use of the alkaline material is not necessary when equipment incorporating an inert liner is used for processing the salt containing the anticaking additive. By virtue of the inhibiting effect of the alkaline materials, ordinary iron and steel equipment can be satisfactorily employed providing for increased economy in plant equipment investments, and thereby dispensing with the necessity of employing special salt processing equipment.

In order to further illustrate the invention, the following examples are provided to demonstrate how the anticaking additives of this invention are formulated. It is to be understood however that the examples are included for illustrative purposes only and are not intended to be limiting of the scope of the invention as set forth in the subjoined claims.

Example 1

Glycerin-YPS solution: 2.4 grams of YPS were dissolved in 5 milliliters of hot water, and then this hot aqueous YPS solution was immediately diluted to 100 milliliters volume with glycerine.

Example 2

Glycerine-YPS-soda ash solution: 2.4 grams of YPS and 1.0 gram of soda ash were dissolved in 6 milliliters of hot water. This hot aqueous solution was immediately diluted to 100 milliliters volume with glycerine.

Example 3

Propylene glycol-YPS solution: 2.4 grams of YPS were dissolved in 10 milliliters of water, and this aqueous YPS solution was then diluted to 200 milliliters with propylene glycol.

Example 4

Propylene glycol-YPS-soda ash solution: 2.4 grams of YPS and 1 gram of soda ash were dissolved in 100 milliliters of water, and this aqueous solution was then diluted to 200 milliliters with propylene glycol.

Example 5

Propylene glycol-glycerine-YPS solution: 2.4 grams of YPS were dissolved in 5 milliliters of hot water. This hot aqueous YPS solution was then immediately diluted to 50 milliliters volume with glycerine, and then diluted to 100 milliliters with propylene glycol.

Example 6

Propylene glycol-glycerine-YPS-soda ash solution: 2.4 grams of YPS were dissolved in 6 milliliters of hot water, and this hot aqueous YPS solution was then immediately diluted to 50 milliliters volume with glycerine, and then diluted to 100 milliliters volume with propylene glycol.

Example 7

Propylene glycol-sorbitol-YPS solution: 2.4 grams of YPS were dissolved in 5 milliliters of hot water. This aqueous solution was then diluted to 50 milliliters with a 70% (by weight) liquid sorbitol solution, and then diluted to 100 milliliters with propylene glycol.

Example 8

Glycerin-potassium ferricyanide solution: 1.65 grams of $K_3Fe(CN)_6$ was dissolved in 5 milliliters of hot water. This solution was then diluted to 100 milliliters with glycerine.

Example 9

Glycerine-propylene glycol-YPS solution: 2.75 grams of YPS were dissolved in 2.5 milliliters boiling water, and the solution was diluted to 40 milliliters with U.S.P. glycerine solution, and then diluted to 100 milliliters with anhydrous propylene glycol and mixed.

In order to more fully describe the invention, tests were conducted to illustrate the superiority of the anticaking additives herein. The test data from evaluation of fine flake salt blends are shown in Table I below. For these tests, 1000 gram samples of fine flake salt were blended with additives as shown in column A. Except for sample No. 1, which is comprised of plain fine flake salt without additives, in all other samples 0.35 milliliter of additive was intermixed with 1000 grams of salt. The samples were placed in 400 milliliter tall form beakers and then placed on top of an oven where they were subjected to mild drying conditions for a period of six days. The beakers were then inverted over a U.S. 12 mesh test screen, with salt retained on same being weighed to indicate the amount of caking taking place in each sample. The results expressed as percentage retained on the screen are shown in column B of the table.

TABLE 1.—ANTICAKING ADDITIVES WITH FINE FLAKE SALT

| Sample No. | Additive composition A | Percent retained B |
|---|---|---|
| 1 | Plain fine flake (nothing added) | 97.0 |
| 2 | 2.4 g./100 YPS in 95–5% (by volume) USP glycerine-water. | 0 |
| 3 | 2.4 g./100 YPS in 50–45–5% (by volume) propylene glycol-glycerine-water. | 0 |
| 4 | 1.65 g./100 potassium ferricyanide in 95–5% (by volume) USP glycerine-water. | 0 |
| 5 | 1.65 g./100 potassium ferricyanide in 50–45–5% (by volume) propylene glycol-glycerine-water. | 0 |
| 6 | 2.4 g./100 YPS in 50–45–5% (by volume) propylene glycol, 70% sorbitol-water. | 0.6 |
| 7 | 2.4 g./100 YPS in 35–65% (by volume) propylene glycol-water. | 1.9 |
| 8 | 2.4 g./100 YPS dissolved in water. | 67.2 |
| 9 | Glycerine (USP). | 93.8 |

From the results in Table 1, the following conclusion can be made as to the anticaking additives of this invention. First, potassium ferricyanide is approximately equal in effectiveness to sodium ferrocyanide as an anticaking additive for salt. Equivalent iron cyanide contents of both materials were used in the different samples of the tests performed. Second, the samples containing YPS in a solution of propylene glycol-sorbitol-water (in amounts respectively equal to 50–45–5% by volume) and YPS in propylene glycol-water (35–65%), while effective as salt anticaking additives are not as effective as YPS in glycerine-water (95–5%) or YPS in propylene-glycol-glycerine-water (50–45%). Third, as can be seen from samples 2 through 5, the zero percent retained indicates no caking took place, which is in marked contrast to sample No. 8 containing only an iron cyanide (YPS) wherein 67.2% of the salt caked up and could not pass the screen; also in sample No. 9 containing only glycerine, 93.8% caking occurred.

Tests were also run to determine the effectiveness of the anticaking additives of this invention on granulated salt blends. The results from these tests are shown in Table 2 below. In order to carry out these tests one sample was formulated with YPS and water, and five different additive compositions were formulated with YPS and alcohol. A sixth additive with triacalcium phosphate (TCP) was formulated, and also a seventh blank with plain granulated salt was incorporated into the tests. Two bags of each of the samples were palletized under two pallets of salt, and then these were left standing for a period of 35 days storage after which time the bags were opened and examined. The amounts of additives in each blend and the results of the examination of the samples for caking are shown in Table 2.

TABLE 2¹.—ANTICAKING ADDITIVES WITH GRANULATED SALT

| Sample No. | Additive Composition | Results of Examination After 35 Days Storage |
|---|---|---|
| 1 | 5.5 p.p.m. YPS, .036% added water. | Lumpy, lumps grapefruit size and smaller. |
| 2 | 5.3 p.p.m. YPS, 1.8 p.p.m. $Na_2CO_3$, .042% USP glycerine, .0018% added water. | Perfect, no lumps. |
| 3 | 5.0 p.p.m. YPS, 1.8 p.p.m. $Na_2CO_3$, .037% USP glycerine, .0054% added water. | Do. |
| 4 | 5.5 p.p.m. YPS, 1.8 p.p.m. $Na_2CO_3$, 1.9 p.p.m. Tween 80, .042% USP glycerine, .0018% added water. | Do. |
| 5 | 5.0 p.p.m. YPS, 1.8 p.p.m. $Na_2CO_3$, 7.2 p.p.m. NaCl, .037% USP glycerine, .0054% added water. | Near perfect, three marble size fragile lumps. |
| 6 | 0.50% TCP. | Two large hard melon sized lumps, remainder of salt perfect. |
| 7 | Plain granulated salt. | Completely caked and lumpy, lumps hard, melon sized and smaller. |

¹ YPS in this table is expressed as anhydrous sodium ferrocyanide rather than sodium ferrocyanide decahydrate.

The test data shown in Table 2 demonstrate the superiority of YPS-glycerine over a combination simply consisting of YPS and water for direct addition to granulated salt without supplementary drying. It also shows that YPS-glycerine gives better anticaking protection to salt packed under the conditions described than does tricalcium phosphate, which is another widely known and commercially used anticaking additive.

A further test was conducted to determine the effectiveness of the anticaking additives of this invention for use with fine flake salt. The purpose of this test was to observe and compare storage qualities of fine flake salt which had been treated with an additive comprised of glycerine-YPS, and then taking a comparison of this treated product with an untreated fine flake salt. The secondary purpose of this test was to verify that the liquid additive mixture of this invention can be adequately mixed with salt, such as for example, fine flake salt from production, using continuous blending equipment as is normally used in the art. For example, such continuous blending equipment might satisfactorily be comprised of a continuous blending screw as is well known in the art. The procedure for the test was to pack both untreated and blended fine flake salt after both were processed through conventional production equipment. Two 60 bag lots were processed through a salt blending screw, with the first 60 bag lot being untreated fine flake salt. The second 60 bag lot had continuously blended therewithin the blending screw, an additive comprised of a 93½:6½% by volume U.S.P. glycerine-water mixture. The water contained dissolved therein YPS and soda ash in the ratio 2.5 and 1.0 grams per 100 milliliters of glycerine-water solution. The actual percent compositions obtained are shown in Table 3 below.

TABLE 3

| Sample No. | Description | Weight content in salt |
|---|---|---|
| 1 | Plain fine flake salt. | |
| 2 | Glycerine. | 0.040%. |
|   | YPS. | 5.8 p.p.m.¹ |
|   | Soda ash. | 2.3 p.p.m. |

¹ Expressed as anhydrous sodium ferrocyanide.

After packing, the 120 bags of salt were palletized, that is, the bags were stacked one above the other in a pattern such that three 20 bag pallets of each sample were stored one on top of the other in separate piles. Inspections of the salt samples from each of the groups of bags were made at 7, 17, 21 and 28 day intervals. The results of the inspections for the 7 and 17 day intervals are shown in Table 4 below.

TABLE 4

| Sample No. | | 7 day inspection | 17 day inspection |
|---|---|---|---|
| 1 | Plain fine flake | Lumpy, watermelon size and smaller, lumps not objectionably hard. | Lumpy, head size to pea size, lumps objectionably hard. |
| 2 | YPS-glycerine treated fine flake. | Completely lump free. | A couple of very fragile small lumps. |

For the 21 and 28 day inspections, the observations were made in a different manner, that is, by screening the three types of fine flake salt through a wood framed screen with ½ inch openings. Salt retained on this screen was a measure of the degree of lumping or caking. The measurements obtained from these 21 and 28 day inspections as the bags were opened and also the condition of the bags after dropping from a waist-high position are shown in Table 5 below.

TABLE 5

| Sample No. | | 21 days storage, percent lumps as opened | 21 days storage, percent lumps after drop |
|---|---|---|---|
| 1 | Plain fine flake | 95 | 18 |
| 2 | YPS-glycerine treated fine flake. | 0.1 | 0 |

| Sample No. | | 28 days storage, percent lumps as opened | 28 days storage, percent lumps after drop |
|---|---|---|---|
| 1 | Plain fine flake | 62.5 | 3.5 |
| 2 | YPS-glycerine treated fine flake. | 9.1 | 0 |

The conclusion from these tests on fine flake salt are, first, that fine flake salt with highly improved storage qualities can be achieved by treating the fine flake salt with a YPS-glycerine mixture. Second, the YPS-glycerine mixture can be continuously blended into the fine flake salt with conventional continuous blending equipment with no after drying of the salt being required.

Tests were also conducted to determine the effect of sodium ferrocyanide solutions both with and without soda ash on steel strips. The purpose of these tests was to determine whether the sodium ferrocyanide solutions effect of discoloring steel equipment could be improved or removed by addition of the soda ash to the YPS mixtures. The procedure for these tests was to prepare four solutions, the analysis of which is shown in Table 6 below.

TABLE 6

(1) 2.4 grams YPS·10H$_2$O dissolved in water, then diluted to volume in 100 ml. volumetric flask.

(2) 2.4 grams YPS·10H$_2$O and 1.0 gram Na$_2$CO$_3$ (soda ash) dissolved in water, then diluted to 100 ml. in volumetric flask.

(3) 2.4 grams YPS·10H$_2$O dissolved in 6 ml. water, then diluted to 100 ml. volume with glycerine.

(4) 2.4 grams YPS·10H$_2$O and 1.0 gram Na$_2$CO$_3$ dissolved in 6 ml. water, then diluted to 100 ml. volume with glycerine.

Ten grams of salt was mixed with 50 ml. of each solution and into each of these four solutions a steel strip was inserted. After a one week period the strips were removed from the solutions, allowed to dry and then examined. Strips one and two were intensely discolored with blue, green, brown and orange colors; strip three contained minor blue speckles. Strip four was uneffected and contained no discolorations. Conclusions from these tests were that glycerine-YPS solutions show only minor discoloration effects on steel contacting salt, and when soda ash is dissolved in these glycerine-YPS solutions these minor discolorations can be eliminated.

Generally the anticaking additives of this invention can equally satisfactorily be used with all evaporated salts, rock and solar salts, pulverized, and compacted flake type salts. More particularly however, the anticaking additives have been found to be effective on salts having an unpacked bulk density, or apparent density of about 500 to about 1300 grams per 1000 cubic centimeters. By the term "apparent density" as used herein, it is meant that a 1000 cubic centimeter container is filled with salt without any packing, then the excess is leveled off the top, and the density of the salt is obtained by weighing the container to determine the number of grams per 1000 cubic centimeters.

As referred to hereinabove this invention is particularly applicable to sodium chloride salt conpositions, and also the invention is particularly applicable to muriate of potash compositions or potassium choride (KCl) salt compositions.

With respect to the composition limits of the iron cyanides used in the anticaking additives, it has been determined that for a preferred glycerine-water solution which contains 95% U.S.P. glycerine and 5% wates, the solubility of YPS in the solution is limited to the solubility of YPS in the 5% water (boiling). For example, about 6.0 grams of YPS can be dissolved in 5 milliliters of boiling water, and this can be maintained in solution at room temperature (70° F.) after dilution with 95 milliliters U.S.P. glycerine. Using this technique, the maximum solubility is about 6.0 grams YPS per 100 milliliters of solution. However, for 95–5% by volume glycerine-water solutions, it has been found that a maximum solubility of YPS at 70° F. amounting to about 8.0 grams of YPS per 100 milliliters of the 95–5% by volume glycerine-water solution is possible. Such a solution was obtained by dissolving 6.0 grams of YPS in 5 milliliters of boiling water and then using U.S.P. gycerine to which 2.0 grams per 100 milliliters of YPS had been dissolved therein. Of course the maximum solubility of the iron cyanides in the anticaking additives of this invention will increase as water percentages are increased, for example at room temperature, YPS has a solubility of about 36 gams per 100 milliliters of water. It has also been determined that the iron cyanides for use in the anticaking additives in this invention will dissolve in anhydrous alcohols to form solutions which can be used equally satisfactorily as additives to prevent caking in salt. For example, YPS will dissolve in anhydrous glycerine by prolonged stirring to form a solution, and specifically, this has been carried out by dissolving 1.35 grams of YPS in 100 milliliters of 99.5% minimum purity glycerine. As to the solubilities of other iron cyanides such as, for example, anhydrous potassium ferricyanide; this compound is also of approximately the same solubility characteristics as YPS. For example, 1.0 gram quantities of this material can be dissolved in either 100 milliliters of U.S.P. glycerine and/or 100 milliliters of 99.5% minimum purity glycerine. Potassium ferricyanide is however, slightly more soluble at room temperature than is YPS, and its maximum solubilities in glyceine, propylene glycol, etc., will slightly exceed those of YPS.

To conclude with respect to the use of water soluble iron cyanide complexes in the anticaking additive, these complexes can be used as a solute in the anticaking additive solution within the broad range of about 0.1 to about 25.0 grams per 100 milliliters of said solution. However, best results have been obtained when the water soluble iron cyanide complex is kept at about 0.5 to about 6.0 grams per 100 milliliters of the solution. When the anticaking additive is incorporated into a salt composition to render it substantially noncaking, the amount added should be such that the water soluble iron cyanide complex is present in the salt composition within a broad range of about 0.00005% to about 0.01% by weight of the salt composition. However, it has been found that the most suitable anticaking properties for the salt composition are obtained when the water soluble iron cyanide complex is kept within the preferred range of about 0.0001% to about 0.002% by weight of the salt composition.

With respect to the composition limits for the water and alcohol used in the anticaking additive composition of this invention, as already stated, the amount of water present in the additive can be very negligible or even zero, or the amount of water can vary up to a relatively large percent of the total anticaking additive composition. In certain of the alcohol-water solutions which are used to keep the iron cyanides in solution, definite amounts of water are needed in order to keep the iron cyanide solutes dissolved. For example, when a propylene glycol-water solution is used to maintain 2.4 grams of YPS in solution in a 100 milliliter mixture of propylene glycol and water at 70° F., at least 65% by volume of the liquid solution must be water with the balance of 35% by volume being propylene glycol. A larger volume percentage of propylene glycol can be employed if the solution is maintained at elevated temperatures. Due to the relatively large percentage of water necessary, this would not be a preferred combination or additive composition for treating salt. When a glycerine-water-propylene glycol solution is used to dissolve the iron cyanide, such as for example, YPS, in order to maintain 2.75 grams of the YPS in solution in 100 milliliters at 70° F. to thereby formulate a preferred solution containing 2.5% by volume water; it has been determined that up to 60% by volume of anhydrous propylene glycol can be used as a replacement for glycerine. Example No. 9 referred to above, illustrates a solution prepared in accordance with this description. As to composition limits in the anticaking additives, from a practical standpoint glycerine-YPS solutions for use on hot salt containing any appreciable amount of water will tend to lose a portion of this water when contacting the hot salt, and this will cause steam and condensation in conveyors, hoppers, scales, etc.; and of course this will promote corrosion of same if such be constructed of conventional iron and steel equipment. Also too much water may cause salt flow to be impeded through the hoppers and scales. Therefore, it has been determined that from a preferred standpoint relatively low amounts of water should be used in the anticaking additive. However, the actual amount of water used will vary due to a number of factors including additive composition, salt temperature, type of mixing equipment used for the additive, length of holding time in bins, etc. From a preferred standpoint, however, it may be stated that for hot salt (over 140° F.) the anticaking additive solution should contain at least 60% by volume alcohol, such as for example, glycerine on an anhydrous basis. Of course, the additives may also be advantageously used with cold salt, and since glycerine is highly viscous at low temperatures, the use of the additives with cold salt normally will require a higher percentage of water than would be used with hot salt in order to reduce viscosity so that good blending occurs. An illustration of the use of the anticaking additive solutions on hot salt and on cold salt is set out in the following example.

Example 10

(a) Hot salt—100 pounds of salt was treated with 16 milliliters of a solution containing 2.4 grams of YPS per 100 milliliters of a solution containing 2½ milliliters water, and 97½ milliliters U.S.P. glycerine.

(b) Cold salt—100 pounds of this salt was treated with 16 milliliters of a solution containing 2.4 grams of YPS per 100 milliliters of solution. The solution contained 15 milliliters of water, and 85 milliliters of U.S.P. glycerine.

In conclusion with respect to the water composition limits for use in the anticaking additive of this invention, as has already been mentioned, water can satisfactorily be present in very negligible amounts or even zero amounts for certain of the anhydrous additive solutions. Therefore, for the purposes of this invention it has been determined that the water can be present within the broad range of about 0 to about 99.9% by volume of the liquid solvent used in the anticaking additive to place the iron cyanide in solution. But since best results have been obtained when the water content is kept relatively low, it is preferred that the water be within a range of about 0 to about 40% by volume of the solvent mixture of alcohol and water used to keep the iron cyanide solute in solution.

As to the amount of alcohol present in the anticaking additive, it has been found that the broad usable range for the alcohol content is about 0.1% to about 100% by volume of the solvent used to dissolve the iron cyanide in the anticaking additive; but best results have been obtained when the amount of alcohol is kept within a preferred range of about 60% to about 100% by volume of the water and alcohol solvent used to dissolve the iron cyanide. When the anticaking additive is incorporated into a salt composition, the amount added should be such that the alcohol is present in the salt composition within a broad range of about 0.010% to about 1.0% by weight of the composition. However, it has been found that the most suitable anticaking properties for the salt composition are obtained when the alcohol is kept within the preferred range of about 0.020% to about 0.050% by weight of the salt composition.

With respect to the amount of soda ash to be used in the anticaking solutions of the invention, laboratory tests were run which established that a minimum of about 0.3 gram of soda ash per 100 milliliters of the anticaking additive solution were required to minimize subsequent discolorations of the additive solution, equipment, and the salt; and also it was determined that best results to avoid discolorations were obtained when the soda ash content was kept within a preferred range of 0.5 to about 1.0 grams per 100 milliliters of the anticaking additive solution. While soda ash is a preferred material for avoiding discolorations when using the anticaking additive of this invention, it is also contemplated as within the scope of this invention that other alkaline materials than soda ash would perform equally satisfactory for the purpose of avoiding these discolorations. Examples of such other alkaline materials would be sodium hydroxide, potassium hydroxide, calcium hydroxide, trisodium phosphate and magnesium carbonate.

KCl compositions

The examples hereinabove related to sodium chloride salt compositions, but only for the purpose of demonstrating the most suitable techniques of carrying out the invention. The following specific examples illustrate muriate of potash or potassium chloride (KCl) compositions in accordance with the invention.

Tests have been conducted showing that water soluble ferrocyanide and ferricyanide-polyhydric alcohol combinations exhibit synergistic anticaking effects with potassium chloride.

Testing Procedure 1000 g. of dry, crystalline (99½% minus US 12, 91% plus US 70) potassium chloride were weighed and transferred into glass bottles. To each sample 0.10% water was added and blended by shaking. Following this procedure, 0.35 ml. of the solutions described below were added and blended by shaking. After blending, 450 gram amounts were removed from each bottle and inserted into 18 ounce polyethylene bags through which a few small holes had been punched for air diffusion. These filled bags were then placed atop an oven (90° F.) and allowed to dry. After three days the bags were opened. The material retained on an 8 mesh test screen was weighed, converted to percent, and reported as caked material.

Additive Treating Solutions

Example 11

2.3 g./100 ml. sodium ferrocyanide decahydrate, 0.6 g./100 ml. sodium carbonate dissolved in 100 ml. water.

Example 12

90%–10% (by volume) glycerine-water.

Example 13

2.3 g./100 ml. sodium ferrocyanide decahydrate, 0.6 g./100 ml. sodium carbonate dissolved in 10 ml. hot water, then diluted in 100 ml. with glycerine.

Example 14

45%–45%–10% (by volume) glycerine-propylene glycol-water.

Example 15

2.3 g./100 ml. sodium ferrocyanide decahydrate, 0.6 g./100 ml. sodium carbonate dissolved in 10 ml. hot water, then diluted to 100 ml. with a 1:1 solution of glycerine-propylene glycol.

Example 16

90%–10% (by volume) ethylene glycol-water.

Example 17

2.3 g./100 ml. sodium ferrocyanide decahydrate, 0.6 g./100 ml. sodium carbonate dissolved in 10 ml. hot water, then diluted in 100 ml. with ethylene glycol.

Example 18

1.65 g./100 ml. anhydrous potassium ferricyanide, 0.6 g./100 ml. sodium carbonate dissolved in 100 ml. water.

Example 19

1.65 g./100 ml. anhydrous potassium ferricyanide, 0.6 g./100 ml. sodium carbonate dissolved in 10 ml. hot water, then diluted to 100 ml. with glycerine.

Example 20

70%–30% (by volume) diethylene glycol-water.

Example 20A 2.3 g./100 ml. sodium ferrocyanide decahydrate dissolved in 30 ml. hot water, then diluted to 100 ml. with diethylene glycol.

END PRODUCT COMPOSITION (WEIGHT PERCENTAGES) AND PERCENTAGE CAKED MATERIAL AFTER THREE DAY ATOP OVEN

| Example No. | Sodium Ferrocyanide Decahydrate | Sodium Carbonate | Potassium Ferrocyanide | Glycerine | Propylene Glycol | Ethylene Glycol | Diethylene Glycol | Water | Caked Material |
|---|---|---|---|---|---|---|---|---|---|
| 21 | 0.0008 | 0.0002 | | | | | | 0.135 | 100 |
| 22 | | | | 0.039 | | | | 0.104 | 100 |
| 23 | 0.0008 | 0.0002 | | 0.039 | | | | 0.104 | 0 |
| 24 | | | | 0.019 | 0.016 | | | 0.104 | 100 |
| 25 | 0.0008 | 0.0002 | | 0.019 | 0.016 | | | 0.104 | 0 |
| 26 | | | | | | 0.035 | | 0.104 | 100 |
| 27 | 0.0008 | 0.0002 | | | | 0.035 | | 0.104 | 0 |
| 28 | | 0.0002 | 0.0006 | | | | | 0.135 | 100 |
| 29 | | 0.0002 | 0.0006 | 0.039 | | | | 0.104 | 0 |
| 30 | | | | | | | 0.027 | 0.110 | 100 |
| 31 | 0.0008 | | | | | | 0.027 | 0.110 | 0 |
| Blank | | | | | | | | 0.100 | 100 |

For the KCl compositions of this invention the preferred treating solution is the ethylene glycol, YPS, soda ash combination. A relatively low viscosity contributing to easier end product blending favors this combination over others described.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A particulated salt composition having on at least a portion of the surfaces of the particles thereof an anticaking additive solution comprising a water soluble iron cyanide complex present in an amount of from about 0.00005% to about 0.01% by weight of said composition and alcohol solvent present in an amount of from about 0.010% to about 1% by weight of said composition, said alcohol being selected from the group consisting of polyhydric alcohol, or polyhydric alcohol in mixture with monohydric alcohol, said salt being selected from the group consisting of sodium chloride, potassium chloride, or mixtures thereof.

2. The salt composition as defined in claim 1 wherein said alcohol is present in an amount of from about 0.020% to about 0.05% of said composition.

3. The salt composition as defined in claim 1 wherein said iron cyanide complex is selected from the group consisting of sodium ferrocyanide, potassium ferricyanide, and mixtures thereof.

4. The salt composition as defined in claim 1 wherein said alcohol is selected from the group consisting of glycerine, propylene glycol, sorbitol, ethylene glycol and mixtures thereof.

5. The salt composition as defined in claim 1 further characterized as including an alkaline material in said anticaking additive in an amount of about 0.3 to about 1.0 gram of alkaline material per 100 ml. of anticaking additive to inhibit the formation of Prussian blue discoloration, said alkaline material being selected from the group consisting of sodium carbonate, potassium hydroxide, calcium hydroxide, trisodium phosphate, and magnesium carbonate.

6. The method of treating particulated salt to inhibit the caking tendency thereof which comprises the step of applying to at least a portion of the salt particles an anticaking additive comprising a solution containing from about 0.1 to about 25 grams of a water soluble iron cyanide complex per 100 milliliters of said solution, and a solvent containing from about 0.1% to about 100% by volume alcohol, said alcohol being selected from the group consisting of polyhydric alcohol, or polyhydric alcohol in mixture with monohydric alcohol, said chloride salt being selected from the group consisting of sodium chloride, potassium chloride, or mixtures thereof.

7. The method of claim 6 wherein said iron cyanide complex is selected from the group consisting of sodium ferrocyanide, potassium ferricyanide, and mixtures thereof.

8. The method of claim 6 wherein said alcohol is selected from the group consisting of glycerine, propylene glycol, sorbitol, ethylene glycol and mixtures thereof.

9. The method of claim 6 further characterized as including an alkaline material in said anticaking additive in an amount of about 0.3 to about 1.0 gram of alkaline material per 100 ml. of anticaking additive to inhibit the formation of Prussian blue discoloration, said alkaline material being selected from the group consisting of sodium carbonate, potassium hydroxide, calcium hydroxide, trisodium phosphate, and magnesium carbonate.

10. The method of claim 6 wherein said alcohol is a polyhydric alcohol.

11. The method of claim 10 wherein said alcohol is selected from the group consisting of glycerine, propylene glycol, sorbitol, ethylene glycol and mixtures thereof.

12. The method of claim 10 further characterized as including an alkaline material in said anticaking additive in an amount of about 0.3 to about 1.0 gram of alkaline material per 100 ml. of anticaking additive to inhibit the formation of Prussian blue discoloration, said alkaline material being selected from the group consisting of sodium carbonate, potassium hydroxide, calcium hydroxide, trisodium phosphate, and magnesium carbonate.

13. In a particulated chloride salt composition the improvement comprising an anticaking additive comprised of liquid material containing from about 0.1 to about 25 grams of water soluble iron cyanide complex per 100 milliliters of said liquid, and a solvent containing from about 0.1% to about 100% by volume water soluble alcohol, and said chloride salt being selected from the group consisting of sodium chloride, potassium chloride, or mixtures thereof, and said alcohol being selected from the group consisting of polyhydric alcohol, or polyhydric alcohol in mixture with monohydric alcohol, said chloride salt being selected from the group consisting of sodium chloride, potassium chloride, or mixtures thereof.

14. In the composition of claim 13 further characterized as containing a soluble alkaline material in an amount of about 0.3 to about 1.0 gram of alkaline material per 100 ml. of anticaking additive to inhibit the formation of Prussian blue discoloration, said alkaline material being selected from the group consisting of sodium carbonate, potassium hydroxide, calcium hydroxide, trisodium phosphate, and magnesium carbonate.

15. In the composition of claim 14 said alkaline material being selected from the group consisting of sodium carbonate, potassium hydroxide, calcium hydroxide, trisodium phosphate, and magnesium carbonate.

16. In the composition of claim 13 the improvement further characterized as comprising an anticaking additive for particulated sodium chloride or potassium chloride salt, said salt having an apparent density of about 500 to about 1300 grams per 1000 cubic centimeters, consisting essentially of a solution containing per 100 milliliters, from about 0.5 to about 8 grams of water soluble iron cyanide complex selected from the group consisting of sodium and potassium ferrocyanides and ferricyanides or mixtures thereof, and about 35 to about 100 milliliters of an alcohol selected from the group consisting of at least one or more of $C_2$-$C_6$ monohydric and polyhydric alcohols and zero to about 65 milliliters water, wherein when said alcohol is present in amount of 100 milliliters and said water content is zero, then said iron cyanide is present at a level of 1.35 grams or less.

References Cited

UNITED STATES PATENTS

| | | | |
|---|---|---|---|
| 2,056,540 | 10/1936 | Segura | 23—89 XR |
| 2,056,540 | 10/1936 | Segura | 23—89 XR |
| 2,947,603 | 8/1960 | Miller | 23—89 |
| 2,965,444 | 12/1960 | Diamond | 23—89 |
| 3,009,775 | 11/1961 | Ladenburg et al. | 23—89 |
| 3,036,884 | 5/1962 | Kaufmann | 23—89 |
| 3,188,172 | 6/1965 | Schultze et al. | 23—89 |
| 3,240,558 | 3/1966 | Heiss et al. | 23—89 |
| 3,272,593 | 9/1966 | Fee | 23—89 |
| 3,374,098 | 3/1968 | Heiss et al. | 23—89 |

EDWARD STERN, Primary Examiner

U.S. Cl. X.R.

23—50; 252—383